US010065245B2

United States Patent
Wepfer et al.

(10) Patent No.: US 10,065,245 B2
(45) Date of Patent: Sep. 4, 2018

(54) DEVICE FOR THE DEBURRING OF TUBES

(71) Applicants: Hans Wepfer, Berg-Daegerlen (CH); Kenneth Wohlgensinger, Hettlingen (CH)

(72) Inventors: Hans Wepfer, Berg-Daegerlen (CH); Kenneth Wohlgensinger, Hettlingen (CH)

( * ) Notice: Subject to any disclaimer, the term of this patent is extended or adjusted under 35 U.S.C. 154(b) by 0 days.

(21) Appl. No.: 14/913,823

(22) PCT Filed: May 9, 2014

(86) PCT No.: PCT/CH2014/000064
§ 371 (c)(1),
(2) Date: Feb. 23, 2016

(87) PCT Pub. No.: WO2015/027347
PCT Pub. Date: Mar. 5, 2015

(65) Prior Publication Data
US 2016/0199917 A1 Jul. 14, 2016

(30) Foreign Application Priority Data

Aug. 24, 2013 (CH) ...................... 1444/13

(51) Int. Cl.
*B23B 5/16* (2006.01)
*B23B 51/00* (2006.01)
*B23B 51/10* (2006.01)

(52) U.S. Cl.
CPC .............. *B23B 5/168* (2013.01); *B23B 5/16* (2013.01); *B23B 51/103* (2013.01);
(Continued)

(58) Field of Classification Search
CPC ....... B23B 5/167; B23B 5/16; B23B 2215/72; B23B 51/103; B23B 2220/04;
(Continued)

(56) References Cited

U.S. PATENT DOCUMENTS 2,359,954 A * 10/1944 Whipple ................. B23B 27/12
407/7
2,620,689 A * 12/1952 Cogsdill ............... B23B 51/101
408/187
(Continued)

FOREIGN PATENT DOCUMENTS

CH 703563 A2 2/2012
DE 9112499.9 U1 11/1991
(Continued)

OTHER PUBLICATIONS

WO 2012/019312 Machine Translation, p. 1, Mar. 11, 2017.*
FR 1,291,624 Machine Translation, pp. 3-4, Mar. 10, 2017.*

*Primary Examiner* — Nicole N Ramos
(74) *Attorney, Agent, or Firm* — Birch, Stewart, Kolasch & Birch, LLP

(57) ABSTRACT

The present invention relates to a device for deburring tubes, in particular tube ends. Said device comprises a proximal and a distal end and has a substantially basic body (1) with a plurality of contact surfaces (20, 20', 20"). It further includes a shaft (2) and a guide chamber (4) in which a guide bushing (6) is displaceably mounted. A spring (5) is arranged in such a manner in the guide chamber (4) that a restoring force is exerted onto the guide bushing (6). A blade (11) is releasably fastenable on the guide bushing (6). A guide groove (19), by means of which the blade (11) is guided, extends along an outside surface of the conical basic body (1). The present invention further relates to the use of the device according to the invention for deburring tubes (17), in particular tube ends.

22 Claims, 2 Drawing Sheets

(52) U.S. Cl.
CPC ....... *B23B 2215/72* (2013.01); *B23B 2220/04* (2013.01); *B23B 2220/08* (2013.01); *Y10T 408/39* (2015.01); *Y10T 408/85837* (2015.01)

(58) Field of Classification Search
CPC ............. Y10T 408/39; Y10T 408/5621; Y10T 408/8583; Y10T 408/85837; Y10T 408/85843; Y10T 408/865; Y10T 408/868; Y10T 408/899; Y10T 408/909
USPC ... 408/54, 154, 187, 93, 155, 156, 188, 211, 408/227, 708
See application file for complete search history.

(56) References Cited

U.S. PATENT DOCUMENTS

| | | | | |
|---|---|---|---|---|
| 2,649,001 | A * | 8/1953 | Fennell | B23B 51/10 408/158 |
| 2,694,321 | A * | 11/1954 | Riza | B23B 5/168 408/154 |
| 2,703,996 | A * | 3/1955 | Reynolds | B23B 51/10 15/236.1 |
| 2,748,631 | A * | 6/1956 | Neale | B21D 19/005 407/8 |
| 2,804,789 | A * | 9/1957 | Randles | B23B 51/10 408/143 |
| 3,232,145 | A * | 2/1966 | Wilson | B23B 5/167 144/205 |
| 4,207,786 | A | 6/1980 | Astle et al. | |
| 4,220,060 | A * | 9/1980 | Bjodstrup | B23B 5/167 408/191 |
| 4,243,348 | A * | 1/1981 | Paige | B23C 3/126 407/107 |
| 4,580,932 | A * | 4/1986 | Depperman | B23B 51/105 407/9 |
| 4,819,525 | A * | 4/1989 | Rabe | B23P 6/00 408/1 R |
| 5,716,171 | A * | 2/1998 | Malott | B23B 51/101 407/9 |
| 5,810,522 | A * | 9/1998 | Parker | B23B 5/163 408/103 |
| 6,101,696 | A * | 8/2000 | Carter | B21C 37/30 29/90.01 |
| 6,368,032 | B1 * | 4/2002 | Chen | B23B 51/10 408/146 |
| 6,869,257 | B2 * | 3/2005 | Wiles | B23B 51/101 408/154 |

FOREIGN PATENT DOCUMENTS

| | | | | |
|---|---|---|---|---|
| EP | 0102488 | A1 * | 3/1984 | ............. B23B 5/16 |
| EP | 2364802 | A1 | 9/2011 | |
| FR | 1291624 | A | 4/1962 | |
| SU | 1731445 | A1 | 5/1992 | |
| WO | WO 92/20485 | A1 | 11/1992 | |
| WO | WO 2012019312 | A1 * | 2/2012 | ............. B23B 5/168 |

* cited by examiner

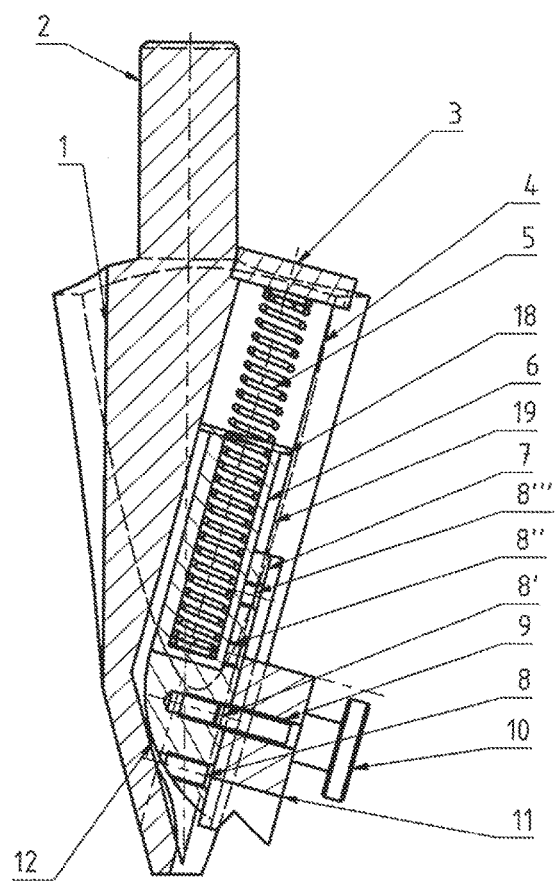
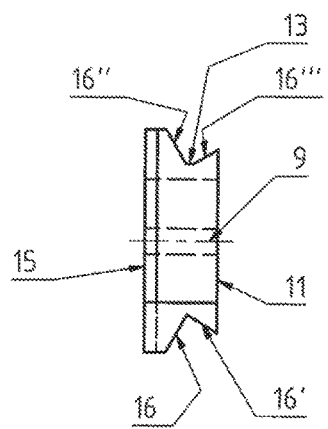
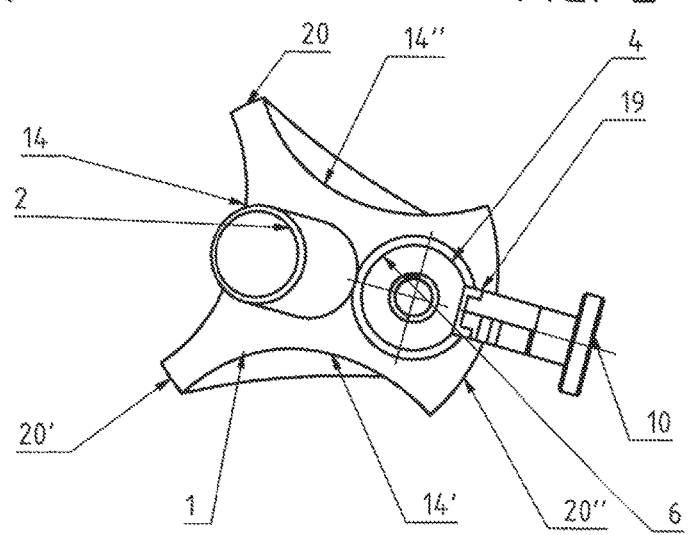

DEVICE FOR THE DEBURRING OF TUBES

TECHNICAL SCOPE

The present invention relates to devices for deburring tubes. It relates in particular to devices for deburring tube ends, as well as to the use thereof according to the preambles of the independent claims.

PRIOR ART

In principle, appropriate pieces are cut from precut tube lengths in a plurality of fields of application relating to construction and installation. Burrs, which have to be removed, remain on the tubes in the case of said cutting actions. Burrs can exist irrespective of the tube material. Thus, said tubes are able to consist of plastics material or metal depending on the application.

Special deburring tools, which can be fitted as an attachment on conventional, rotationally-driven machines, such as, for example, drilling machines, are readily available for deburring on site. Such devices have a concave form which is suitable for receiving the tube end and deburr the tube ends by means of a blade mounted inside the concave form. Such devices are, however, afflicted with diverse disadvantages. Thus, the concave forms are only able to adapt to a limited tube size, namely in dependence on its diameter. Consequently, an engineer must carry a corresponding arsenal of such tools in order to be prepared for different tube diameters. In addition, said devices are also cumbersome to use. As they do not have any resilience whatsoever, they are only able to be used with certain materials and at certain rotational speeds of the drilling machines used. Otherwise, there is the risk of damaging the tube ends, the drilling machine or both.

More flexible, in this case, are tube deburrers with a conical form, on the cone lateral surface of which a blade is mounted. Such a device is shown, for example, in CH 703 563 A2 (Wepfer-Jucker et al.). Here a tube deburrer is proposed where a cutting edge is introduced into a groove and the cutting edge is spring-loaded by means of a spring element in such a manner that it automatically adapts to a certain variability of tube diameters. Even said device, however, can only be used with a comparatively narrow range of tube diameters. In addition, such a conical attachment is comparatively heavy and requires a correspondingly strong rotational drive in order to deburr in a reliable manner.

A further conical tube deburrer is shown in WO 92/20485 A1 (Taylor, C. et al.). The tube deburrer has a substantially conical tool form and a bore which is provided in the tool head and contains a guided blade which projects out of the interior on a lateral edge of the cone. Said deburrer also has a spring and can consequently be adapted to different tube diameters within a certain range. The adaptability, however, is limited in an analogous manner to CH 703 563 A2 above. In addition, the comparatively large contact surface of the cone with the tube end to be deburred generates a comparatively high friction loss and can result in unwanted heat build-up in the case of correspondingly susceptible materials.

Consequently, it is an object of the invention to provide a device for deburring tubes which is suitable for a wide spectrum of tube diameters and is simple to use. In particular, at least one disadvantage of what is known is to be overcome.

REPRESENTATION OF THE INVENTION

Said object has been achieved by a device for deburring tubes, in particular tube ends, according to the characterizing part of the independent claims.

One aspect of the present invention relates to a device for deburring tubes, in particular tube ends. The device includes a distal and a proximal end. In terms of the present invention, the distal end of the device is the end of the device facing the workpiece. In a corresponding manner, the proximal end of the device is the end of the device remote from a workpiece. The device according to the invention further includes a substantially conical basic body with a plurality of contact surfaces. In terms of the present invention, a substantially conical basic body is to be understood as a basic body which describes a geometrical cone shape in its outside dimension and in particular in rotation about its longitudinal axis. Accordingly, deviations from a strict cone shape are able to be provided by recesses, grooves and bulges. This would still correspond to a substantially conical basic body. A plurality of contact surfaces can be two or more contact surfaces in number. In a preferred manner, the number of contact surfaces is between two and five and in a particularly preferred manner is three contact surfaces. In terms of the present invention, a contact surface is an outside surface of the conical basic body which comes into physical contact with the workpiece to be machined in operation. Thus, a plurality of contact surfaces can be formed, for example, as a result of the substantially conical basic body form dividing the lateral surface by means of recesses into a plurality of contact surfaces. Consequently, according to the invention, the number of contact surfaces can increase whilst at the same time the contact surface as a whole decreases. The device according to the invention additionally comprises a shaft. The device further includes a guide chamber in which a guide bushing is displaceably mounted. In addition, a spring is arranged in the guide chamber in such a manner that a restoring force is exerted onto the said guide bushing. A blade is additionally releasably fastenable on the guide bushing. A guide groove extends in the longitudinal direction along an outside surface of the conical basic body. The blade is guided by means of said guide groove.

In a particular embodiment, the conical basic body is tapered from the proximal toward the distal end and, in a particular embodiment, describes an opening angle of between 10° and 20°, in a particularly preferred manner of 15°. Said opening angle is defined by a virtual extension of a contact surface up to a cone point which intersects said contact surface as an extension of the longitudinal axis of the device. The angle described in this manner would be the opening angle in terms of the present application.

In a particular embodiment, the substantially conical basic body comprises recesses. In a preferred manner it comprises recesses in such a manner that a total of three contact surfaces are formed which are designed such that in operation they contact the tube to be deburred. With said realization, weight can be saved on the device according to the invention. In addition, the contact surface, which is reduced overall, reduces friction losses and less friction heat is generated. The recesses can also contribute to the fact that burr material removed by the device is better diverted and the machining location additionally better ventilated. The recesses can assume the form of dents in the cone surface of the substantially conical basic body.

In a further particular embodiment, the guide chamber is formed by a cylindrical bore. Said bore extends parallel to one of the contact surfaces. In said particular embodiment, the contact surfaces are developed, for example, in an unequal manner. The wider of the three contact surfaces serves for receiving the cylindrical bore. It extends substantially parallel to the conical outside surface which is the widest and extends from the proximal to the distal end of the conical basic body. In said particular case, the bore extends at an angle of between 10° and 20° with reference to the longitudinal axis of the shaft or in a particularly preferred manner at an angle of approximately 15° with respect to the longitudinal axis of the shaft.

In a further particular embodiment, the shaft is developed such that it is able to be coupled to a rotational drive. The shaft is preferably developed such that it is couplable to a conventional battery pack/drilling machine.

In a particular embodiment, the guide bushing comprises a bushing guide which is designed to guide the displaceability of the guide bushing inside the guide chamber. In a particularly preferred manner, the bushing guide is designed such that it may guide the displaceability of the guide bushing inside the guide chamber at its distal end.

In a particular embodiment, the bushing guide comprises a plurality of threads. In a particularly preferred manner, it comprises four threads. Said threads can be suitable to connect screws to the bushing guide. In particular, such threads are suitable to connect the blade to the bushing guide by means of screws. Thus, an operative connection is created between the blade and the bushing guide.

In a particular embodiment, the blade is releasably fastenable at different places along the guide bushing. This can be brought about, for example, as a result of the blade being screw-connected to one of the threads provided at different positions of the bushing guide.

In a particular embodiment, the guide bushing comprises a guide collar. Said guide collar is designed to guide the displaceability of the guide bushing inside the guide chamber. In a further particular embodiment, the guide bushing comprises a guide collar at its proximal end. Said guide collar is developed such that it may guide the guide bushing inside the guide chamber at its proximal end. The guide collar is preferably developed so as to be comparatively narrow with reference to the overall length of the guide bushing. In a particularly preferred manner, the guide collar is developed such that it connects with accuracy of fit and in a positive locking manner to the inside surface of the guide chamber. Consequently, the guide collar enables a guided movement in the longitudinal direction of the guide chamber of the guide bushing and at the same time allows a small pivoting movement of the guide bushing. In terms of the present invention, this means that the guide bushing does not allow for any lateral movement at its proximal end, but at its distal end includes a pivotability that is limited by the inner wall of the guide chamber. In this case, the guide collar can serve both as a guide for the displaceability in the longitudinal direction of the guide bushing and as a pivot joint for the deflecting movement of the guide bushing in the distal direction.

In a particular embodiment, the guide collar is beveled or developed in a round manner along its outer diameter such that the guide collar comprises a contact radius to the guide chamber. The inner wall of the guide chamber then forms the tangent to a contact point between the guide collar and the guide chamber on the contact radius. In said embodiment, an articulated movement and the action as a pivot joint of the guide collar is improved. As a result, comparably thicker guide collars can also be used, which improves stability overall. In said particular embodiment, the contact radius defines the pivotability for the deflecting movement of the guide bushing in the distal direction.

In a further alternative embodiment, the guide collar is provided with a concave ball-based bearing which may guide the guide bushing inside the guide chamber at its proximal end. In a particular embodiment, the guide collar is concave along its outside diameter such that guide rollers can be introduced such that a roller guideway materializes.

In a particular embodiment, the guide collar is produced from steel, in particular the guide collar is an integral component of the guide bushing. As an alternative to this, the guide collar can also be produced from plastics material which has been pressed on the guide bushing as a collar. Said embodiment could provide that the guide collar is developed so as to be replaceable. Consequently, the service life of the entire device is prolonged.

In a further particular embodiment, the guide bushing comprises a stop on its distal end. Said stop can, for example, be responsible for the initial positioning of the guide bushing. If then in operation, for example, a force is exerted onto the blade, the spring is compressed and the guide bushing correspondingly displaced along the guide chamber against the stop in opposition to the restoring force. In this case, a pivoting movement of the guide bushing is enabled at its distal end, whilst the proximal end of the guide bushing is guided linearly in the guide chamber by the guide collar.

In a particular embodiment, the blade comprises a bore. Said blade is releasably fastenable on the guide bushing by means of a screw. In a particularly preferred manner, in said embodiment the blade can be releasably fastened on various pre-defined threads on the guide bushing.

In a further particular embodiment, the releasably fastened blade comprises a first cutting edge and a second cutting edge. The blade is fastenable in such a manner that the first cutting edge or the second cutting edge is aligned in a distal manner. In operation, it would then be possible to replace a blunt cutting edge in a rapid and uncomplicated manner. The releasably fastened blade can be released by means of a screw connection, rotated by 180° and then refastened.

In a particular embodiment, the blade comprises one non-cutting bottom for the deburring end on each of its cutting edges. In operation, both an outer and an inner edge, that means an outer and inner brow, of a tube end is deburred. Whilst deburring is effected simultaneously inside and outside, the tube end to be rounded is situated in the bottom.

In a particular embodiment, the guide bushing is mounted so as to be displaceable and pivotable inside the guide chamber.

In a further particular embodiment, the guide chamber is locked by means of a closure. Said closure can be removable. As a result, for example, a used spring can be replaced or a possible defect of the guide bushing eliminated. This leads to prolonging the service life of the tool and to a saving in material as the used parts would be replaceable. The closure preferably locks the guide chamber on the outside surface of the conical basic body against the outside. It would also be conceivable to replace the spring with a certain spring constant for a spring with a different spring constant if this were necessary for machining a certain tube material.

In a further particular embodiment, the conical basic body is realized integrally. In a preferred manner, the conical basic body is produced from tool steel.

In a particular embodiment, the device is designed to deburr tubes in a reliable manner with a diameter of between 6 and 60 mm, preferably of between 9 and 54 mm and in a particularly preferred manner of between 15 and 42 mm.

The deburrer according to the invention is versatile, irrespective of the material of the tubes to be deburred. In particular, it is also suitable to deburr chrome steel tubes in a reliable and safe manner. The device according to the invention can be adapted to the different wall thicknesses of the tubes to be deburred.

A further aspect of the present invention relates to the use of a device according to the invention for deburring tubes, in particular tube ends. To this end, the device is pressed by way of its distal end into a tube, in particular into a tube end, and is rotated about its longitudinal axis by means of a rotational drive.

In this case, the blade abrades the edge of the tube and possible burrs are removed in a safe and lasting manner.

Further advantageous embodiments and combinations of features of the invention are produced from the detailed description below and from the entirety of the claims.

BRIEF DESCRIPTION OF THE DRAWINGS

The invention is explained in more detail below by way of specific embodiments and figures without, however, being restricted to the same.

The figures are as follows:

FIG. 1 shows a schematic representation of a side section of a device according to the invention for deburring tubes;

FIG. 2 shows a schematic representation from above of a device according to the invention for deburring tubes;

FIG. 3 shows a schematic representation of a blade for a tube deburrer according to the invention;

In principle, identical parts in the figures are provided with identical references.

WAY TO REALIZE THE INVENTION

Figure 4:
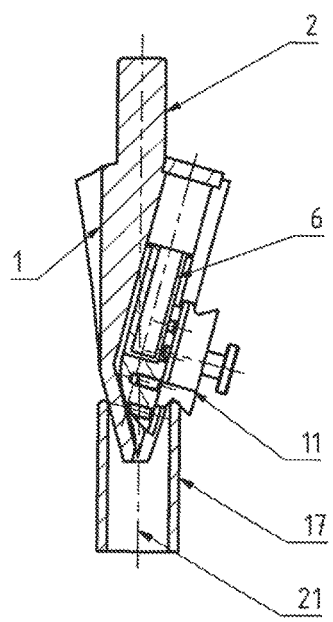
FIG. 4 shows a schematic representation of a side section of the use of a device according to the invention with a comparatively small tube.

The device for deburring tubes shown schematically in FIG. 1 includes a substantially conical basic body 1 which connects to a shaft 2 and forms the distal end of the device. The conical basic body 1 deviates overall from a strictly cone-shaped form, which is shown by the corresponding broken lines which are to represent recesses. A longitudinal axis extends as an extension of the shaft 2 through the conical basic body and up to the tip of the device. In the present example, the device and the substantially conical basic body thereof are developed with three wings. A first wing is realized in a stronger manner than the two remaining wings and accommodates a cylindrical bore which serves as a guide chamber 4. The guide chamber 4 accommodates a guide bushing 6 on which a restoring force acts by means of the spring 5.

A closure 3, which in turn locks the spring 5, is situated on the proximal end of the guide chamber 4. The guide bushing 6 is displaceable in the longitudinal direction of the guide chamber 4 against the restoring force of the spring 5. Said displacement movement along the guide chamber 4 is ensured in a linear manner by means of a guide collar 18 which is mounted on the proximal end of the guide bushing 6. A bushing guide 7, which has a row of bores with corresponding threads 8, 8', 8", 8''', is provided on the distal end of the guide bushing 6. A blade 11 is releasably fastened on each arbitrary thread 8, 8', 8", 8''' by means of a screw 10. In the present example, the blade 11 is fastened on the second thread 8' when viewed from the distal end. The blade 11 itself has a bore 9, through which the screw extends into the thread 8'.

The tube deburrer shown here as an example consequently has a blade 11 which is adjustable 6 along a guide groove 19 inside the guide chamber 4 by means of the displaceability of the guide bushing and is adaptable to different tube diameters. In addition, the adjustability is additionally expanded by the threads 8, 8', 8", 8''' provided along the guide groove 19 on the guide bushing 6. A stop 12 serves for the purpose of enabling positioning at the start. In operation, pressure is exerted against the restoring force of the spring, which is held by the closure 3, as a result of pressing the device. The shaft 2 serves for the purpose of being coupled with a rotational drive. As can be seen from FIG. 1, at its distal end the guide bushing 6 is able to perform a certain pivoting movement which is guided by the stop 12, whilst it is prevented from a pivoting movement at its proximal end by the guide collar which is integrally molded onto the guide chamber 4 in a positively locking manner, but is at the same time displaceable linearly in the direction of displacement and in opposition to the restoring force of the spring 5.

Tubes with different tube diameters and wall thicknesses can be machined in a reliable manner as a result of said design.

FIG. 2 shows the device according to the invention from above. The shaft 2 ends in the substantially conical basic body 1. The recesses 14, 14', 14", which result in a saving in material and weight and reduce the size of the contact surface between the conical basic body 1 and the tube to be machined, can be seen particularly well in FIG. 2. This leads once again to lower friction losses and improved heat removal. The recesses 14, 14', 14" are provided on the conical basic body 1 in such a manner that a total of three contact surfaces 20, 20' and 20" is created. The deburrer is mirror-symmetrical, that means not all contact surfaces are the same size. Whilst a first contact surface 20 and a second contact surface 20' are mirror-symmetrical along an axis of symmetry of the tube deburrer, a third contact surface 20" is larger. In its interior, said contact surface accommodates the guide chamber 4 which is seen from above in FIG. 2 and which, on its side parallel to the contact surface 20", comprises a guide groove 19. The blade, which, by means of a screw 10, is fastenable onto a guide bushing which is not visible from this perspective in FIG. 2, projects out of said guide groove 19. The guide collar 6, which guides said guide bushing in a linear manner inside the guide chamber 4, can, however, be seen from above. The closure 3 has been removed for the purpose of better illustration.

The device is preferably produced from a sturdy material. In the present case, the device has been produced from conventional tool steel.

FIG. 3 shows a blade 11 which is particularly suitable for the device according to the invention. The blade 11 has two oppositely situated blade regions with two cutting edges 16, 16', 16", 16'" each, a first cutting edge 16, 16' and a second cutting edge 16", 16'". Each of said blade surfaces has a bottom 13 which is designed to be non-cutting. The blade fit 15 serves for the purpose of stabilizing the blade 11 in the guide groove in the mounted state and of enabling the blade to be guided in a corresponding manner in the direction of the displaceability of the guide bushing.

FIG. 4 shows in a schematic manner how a tube 21 with a certain tube wall thickness 17 can be deburred by the device according to the invention. The device is connected to a drilling machine (not shown) by means of the shaft 2 and the distal end thereof with the substantially conical basic body 1 is inserted into the open tube end that is to be deburred. In the present case, the third thread from the distal end has been chosen for the fastening of the blade. The blade is guided in such a manner by the spring that it always comprises the correct pressing pressure onto the tube wall 17. In this case, the edge of the tube wall 17 is guided into the bottom of the blade and the two brows of the tube are deburred by way of the blade surfaces. In this case, the device rotates about its own longitudinal axis.

Figure 5:
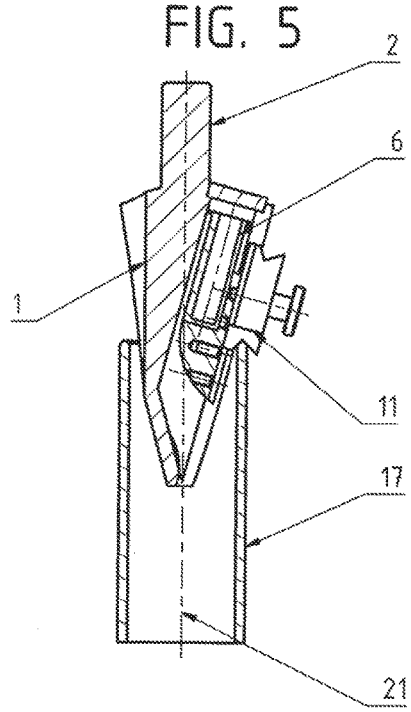
FIG. 5 shows a schematic representation of the use of a device according to the invention with a tube with a comparatively large diameter.

The adapting to a comparatively larger diameter tube 21 can be seen in FIG. 5. In this case, the guide bushing 6 is displaced rearward in the proximal direction against the restoring force of the spring. The blade has also been offset from the present example into the fourth and last thread for better control of the wider tube diameter.

Figure 6:
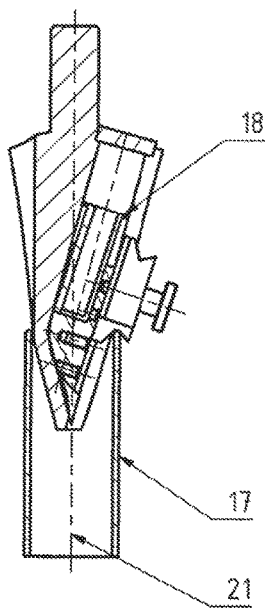
FIG. 6 shows a schematic representation of the use of a device according to the invention with a tube with comparatively thin tube walls.

FIG. 6 illustrates how even tubes with a comparatively small diameter and a thinner tube wall can be deburred using the deburrer according to the invention. The last of the threads is used for this purpose analogously to in FIG. 5.

Figure 7:
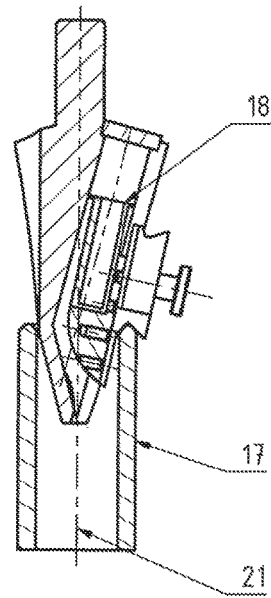
FIG. 7 shows a schematic representation of the use of a device according to the invention with a tube with comparatively thick-walled tube walls.

FIG. 7, in turn, shows the deburring of a tube 21 with a comparatively very thick tube wall 17. In this case, the pivotability of the guide bushing inside the guide chamber and the advantage thereof for the adaptability to different tubes can be seen especially well. The guide collar 18 serves as a joint and is comparatively narrow for this purpose. The thickness of the guide collar influences the pivotability of the joint. Depending on its development, the thickness can be between 0.5 and 5 mm; in the case of an angular guide collar preferably between 2 and 3 mm, whilst in the case of a rounded or beveled guide collar the diameter can be between 5 mm and 10 mm. Finally, the overall dimensioning of the deburring tool determines the absolute thickness of the guide collar and is left up to the expert for the intended application. The guide collar 18 consequently has a dual function as a joint for the pivotability of the distal head of the guide bushing, and as a guide aid and bearing arrangement for the distal-proximal displaceability of the guide bushing.

Naturally, the guide collar 18 can also serve for the purpose of adjusting the blade inward or outward.

By way of the deburring tool shown as an example in the present embodiment, it is possible to deburr tubes 21 in a reliable manner with a diameter of between 9 and 54 mm and a tube wall thickness 17 of between 0.5 and 5 mm.

The invention claimed is:

1. A device for deburring tubes, said device including:
   a distal and a proximal end;
   a substantially conical basic body with a plurality of contact surfaces;
   a shaft;
   a guide chamber in which a guide bushing is displaceably mounted and in which a spring is arranged in such a manner that a restoring force is exerted onto the guide bushing; and wherein a blade is releasably fastenable on the guide bushing, and
   a guide groove which extends in a longitudinal direction along an outside surface of the conical basic body and by means of which the blade is guided,
   wherein the guide bushing is mounted so as to be displaceable and pivotable inside of the guide chamber.

2. The device according to claim 1, wherein the substantially conical basic body is tapered from the proximal toward the distal end.

3. The device according to claim 1, wherein the substantially conical basic body comprises recesses.

4. The device according to claim 1, wherein the guide chamber is formed by a cylindrical bore which extends parallel to one of the contact surfaces.

5. The device according to claim 1, wherein the shaft extends out of the proximal end of the device and is developed such that it is able to be coupled to a rotational drive.

6. The device according to claim 1, wherein the guide bushing comprises a bushing guide which is designed to guide the displaceability of the guide bushing inside the guide chamber.

7. The device according to claim 1, wherein the guide busing comprises a bushing guide which is designed to guide the displaceability of the guide bushing inside the guide chamber at its distal end and the bushing guide is provided on the guide bushing's distal end.

8. The device according to claim 6 or 7, wherein the blade is releasably fastenable at different places along the guide bushing.

9. The device according to claim 1, wherein the guide bushing comprises a guide collar which is designed to guide the displaceability of the guide bushing inside the guide chamber.

10. The device according to claim 1, wherein the guide bushing comprises a stop at its distal end.

11. The device according to claim 1, wherein the blade comprises a bore and is releasably fastenable on the guide bushing by means of a screw.

12. The device according to claim 1, wherein the releasably fastened blade comprises a first cutting edge and a second cutting edge and the blade is fastenable in such a manner that the first cutting edge or the second cutting edge is developed in a distal manner.

13. The device according to claim 12, wherein the blade comprises one non-cutting bottom for the deburring end on each of its cutting edges.

14. Use of the device according to claim 1 for deburring tubes, wherein the device is pressed by way of its distal end into the tube and the device is rotated about its longitudinal axis by means of a rotational drive.

15. The device according to claim 1, wherein the substantially conical basic body comprises recesses in such a manner that there are three contact surfaces which are designed such that in operation they contact the tube to be debarred.

16. The device according to claim 1, wherein the guide chamber is formed by a cylindrical bore which extends parallel to one of the contact surfaces and which extends at an angle of between 10° and 20° with reference to the longitudinal axis of the shaft.

17. The device according to claim 6 or 7, wherein the bushing comprises a plurality of threads.

18. The device according to claim 6 or 7, wherein the bushing comprises four threads.

19. The device according to claim 1, wherein the guide bushing comprises at its proximal end a guide collar which is developed such that it guides the guide bushing inside the guide chamber at the guide bushing's proximal end.

20. The device according to claim 1, wherein the blade comprises a bore and is releasably fastenable at various pre-defined threads on the guide bushing by means of a screw.

21. A device for debarring tube ends, said device including:
- a distal and a proximal end;
- a substantially conical basic body with a plurality of contact surfaces;
- a shaft;
- a guide chamber in which a guide bushing is displaceably mounted and in which a spring is arranged in such a manner that a restoring force is exerted onto the guide bushing, and wherein a blade is releasably fastenable on the guide bushing, and
- a guide groove which extends in a longitudinal direction along an outside surface of the conical basic body and by means of which the blade is guided,
- the guide bushing comprises a guide collar at its proximal end and the guide collar is developed such that it connects in a positive locking manner to the inside surface of the guide chamber.

22. Use of the device according to claim 21 for deburring tube ends, wherein the device is pressed by way of its distal end into the tube end and the device is rotated about its longitudinal axis by means of a rotational drive.

* * * * *